Nov. 7, 1944.    R. P. SCHERER    2,362,410
METHOD OF MAKING FEEDER HEADS
Original Filed Dec. 5, 1939    2 Sheets-Sheet 2
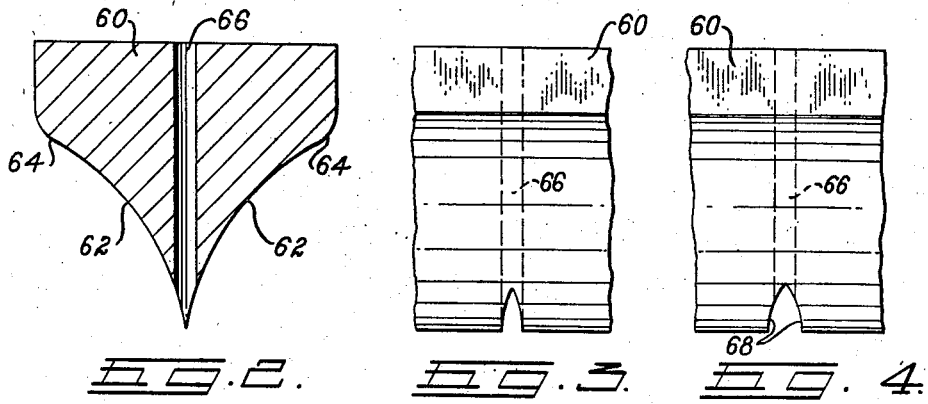
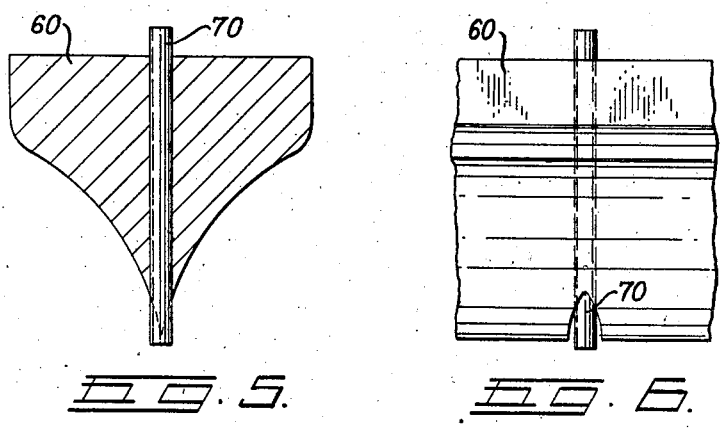
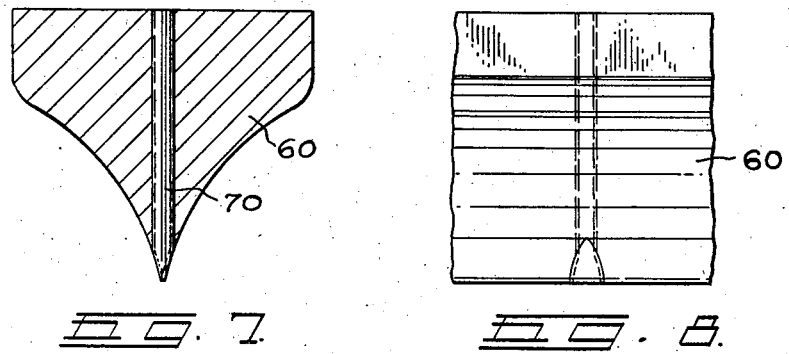
Inventor
Robert P. Scherer
By Parker and Burton
Attorneys Patented Nov. 7, 1944

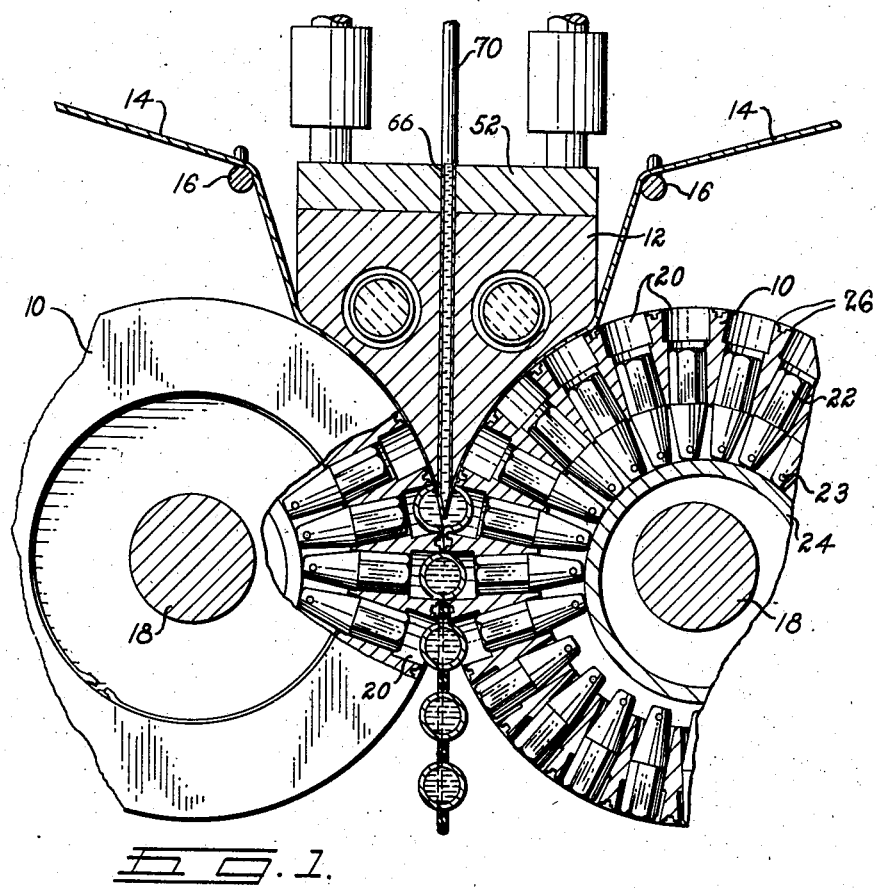

2,362,410

UNITED STATES PATENT OFFICE 2,362,410

METHOD OF MAKING FEEDER HEADS

Robert P. Scherer, Detroit, Mich., assignor, by mesne assignments, to Gelatin Products Corporation, Detroit, Mich., a corporation of Michigan Original application December 5, 1939, Serial No. 307,666. Divided and this application December 26, 1941, Serial No. 424,479

4 Claims. (Cl. 29—148.2)

This invention relates to improvements in a method of making a feeder head and particularly a content material delivery feeder head for a machine adapted to form and to fill capsules. This application is a division of my copending application for patent, Serial No. 307,666, filed December 5, 1939, patented May 11, 1943, No. 2,318,718.

The object of this invention is to provide an improved method of manufacturing a novel feeder head or segment which is so constructed as to exhibit two oppositely outwardly concave surfaces or faces which converge to a relatively narrow edge, and through which edge opens, at spaced points therein, a plurality of material discharge passageways. Each discharge passageway opens through said edge in the form of a slit which extends linearly of the edge. Each discharge passageway terminates at the edge of the feeder head in a pair of thin wall portions which conform generally with the contour of the two converging concave surfaces of the feeder head. Such thin walled portions are formed by a thin walled tube which is mounted within and extends through a passageway formed in the feeder head and which tube constitutes the discharge passage proper. This improved process relates to a method of manufacturing such a feeder head.

The objects, advantages and meritorious features of this invention will become more fully apparent from the following specification, appended claims and accompanying drawings, wherein:

Fig. 1 is a sectional view through the feeder head and associated die members of the machine showing the manner of delivering capsule content material in the forming of the capsules, Figs. 2 and 3 are cross-sectional and side views, respectively, of the feeder head showing the first step in the formation of the delivery passage, Fig. 4 is a view similar to Fig. 3 but after the opening of the passage at the edge of the feeder head has been enlarged, Figs. 5 and 6 are cross-sectional and side views, respectively, of the feeder head after the delivery tube has been inserted, and Figs. 7 and 8 are cross-sectional and side views, respectively, of the feeder head after the end portion of the delivery tube at the edge of the feeder head has been compressed to form a narrow discharge slit.

Referring in detail to the drawings, I have shown in Fig. 1 two die members 10—10 of the roll type provided on their faces with a plurality of die cavities or pockets in which the capsules are formed, filled, sealed and severed. Superimposing these die rolls is a feeder head 12 having converging side faces tapering to a thin edge or apex which enters between the die rolls as shown. This arrangement in general is similar to that illustrated in my patent, No. 2,288,327, dated June 30, 1942, but differs therefrom as will be more particularly pointed out hereinafter.

Two bands or ribbons 14—14 of capsule forming material, such as a gelatinous plastic substance, are fed between the die rolls. The two bands are delivered from opposite sides of the machine and directed over guides 16—16 mounted above the die rolls. From thence the bands pass between the converging side walls of the feeder head and the die rolls and thence between the die rolls and on out to the other side. The converging sides of the feeder head have a concave curvature conforming in general to the curved faces of the die rolls but specifically there is a slight variation in these two curved elements for the purpose of obtaining a better seal as more particularly pointed out in my Patent No. 2,318,718, dated May 11, 1943.

Each die roll is mounted on a shaft 18. Each die roll is provided with a plurality of die cavities or pockets 20 which correspond in number, shape and position on the two die rolls. The die rolls are mounted on their respective driving shafts so that when rotated in opposite directions at the same speed the cavities 20 on one die roll align themselves opposite a cavity in the other roll when they pass through the plane intersecting the axes of the rolls.

In each cavity a plunger 22 is disposed which is free to reciprocate longitudinally therein as it is urged by gravity. Each row of plungers is parallel to the axis of the die roll. The several plungers on each row are connected together for joint reciprocal movement by a pin 23 extending through the inner ends of the plungers. Within each die roll is a sleeve 24 having a limited radial play. Each sleeve 24 acts as a cam in its respective die roll and urges all the plungers 22 outwardly as they swing below the center of the die roll to insure clearance of the capsule cavity.

The die cavities or pockets 20 are spatially arranged in such a way upon the die rolls and so provided with surrounding ledges and intermediate elevations 21 that the maximum number of accurately formed and properly sealed capsules are produced. There is also a minimum wastage of content material within the net as described more fully in my Patent No. 2,318,718, dated May 11, 1943.

As previously stated this invention relates to the manufacture of the novel feeder head here shown. The feeder head 12 is constructed in a novel way to inject fluid filler substances directly through the apex of the feeder head into the heart of the capsule as it is formed as shown in Fig. 1. Referring to Fig. 1 the feeder head block 12 is drilled or otherwise formed with one or more passages 66 extending from the top side and opening out through the common edge of the converging arcuate faces. In each passage 66 a tube 70 is mounted. The lower end of each tube is swaged to form a narrow slit extending linearly of said edge which edge constitutes the apex of the feeder head.

The opposite ends of the tubes project above the feeder head and through a supporting block 52 to which the feeder head is attached. The tubes are flexible in their extension away from the feeder head to permit free flotation. The block 52 and the feeder head 12 are mounted for limited universal movement so that the feeder head floats on the converging portions of the bands 14—14 supported upon the die rolls 10, shifting up or down or to the side and even turning or tilting slightly to adjust itself to any irregularity in band thickness. This feature is described and claimed in my Patent No. 2,288,327, dated June 30, 1942.

The feeder head is formed in a novel manner. The various steps in its manufacture are shown in Figs. 2 to 8, inclusive. An elongated metal block 60 is first shaped by under-cutting to provide opposite concave outer faces 62—62 converging to a common edge or apex as shown. The shoulders 64—64 meet at the point where the concave faces meet the original sides of the block. The feeder head block is then drilled with one or more passages 66 from the top side through to the common edge or apex. The mouths of the passages opening through the apex of the block open through the opposite concave faces as shown in Fig. 3. These mouths are now widened in the manner shown at 68 in Fig. 4. Figs. 2 to 4 show the condition of the block after these operations.

Tubes of readily deformable thin walled material are inserted in the passages 66. One such tube is shown at 70 in Fig. 5. The opposite ends of the tube project beyond the block. Preferably only a small portion of the tube projects beyond the apex as indicated in Figs. 5 and 6. A small thin shim is then placed in the apex end of each tube and arranged so that it extends in the direction of the apex. The tubes are now crimped down until the side walls of each tube at the widened mouth of the passage 66 assume the curvature of the side walls 62—62. At the same time the side walls of the tube at this point spread laterally to fill the wide mouth of the passage as indicated in Fig. 8. The shim prevents the walls of the tube from entirely collapsing upon one another so that there is left, upon removal of the shim, a slight clearance in the form of a narrow slit between the flattened sides of the tube. When properly formed, this slit is in alignment with the edge or apex and extends substantially the width of the mouth of the passage. If the tube, following flattening, projects beyond the edge of the head, it may be trimmed to extend in alignment therewith.

The tube is flattened to substantially a knife edge opening linearly along the edge of the feeder head. For example, a ⅛" tube might be flattened to produce an opening transversely the edge of the feeder head of .010". The opening formed is of such size that it exerts a capillary action on the liquid content material fed through the tube tending to hold the discharge opening full and to prevent wiping of content substance off by the gelatin bands advancing over the head.

The swaging of the tube which produces the flattening thins out the tube wall so that there is a tendency for the tube at its flattened end to breathe, opening for discharge under the ejection impulse and closing under pressure of the gelatin bands between impulses. In use, filler substances are fed down the tubes 70 and out through the narrow slits in the bottom ends thereof. The filler substances are preferably urged through the tubes under intermittent pressure operating in timed relationship to the rotation of the die rolls and the position of the die cavities thereon.

What I claim:

1. The method of making a feeder head which comprises shaping a metal block to provide converging side walls terminating in an apex, providing a passageway through the block opening out through the apex and the opposite sides thereof, widening the opening of the passage at the apex end linearly of the apex, extending a tube through said passageway with a portion thereof projecting beyond the sides at the apex of the block, inserting a thin shim in the apex end of the tube extending in alignment with the apex, flattening the apex end of the tube upon the shim to form a narrow tubular slit extending in alignment with the apex of the block and withdrawing the shim.

2. The method of making a feeder head which comprises shaping a metal block to provide sides converging to a common edge, providing a passageway through the block opening out through said edge and the adjacent portions of said sides of the block, widening the opening of the passageway in line with the edge, positioning an open ended tube in said passageway with one end terminating substantially flush with said edge of the block and with portions thereof adjacent said end projecting from said sides, and flattening said projecting portions of the tube to make them extend substantially flush with said sides of the block and filling the passageway opening lengthwise of the edge and reducing said end of the tube to a narrow discharge slit extending in alignment with said edge.

3. That method of making a feeder head which comprises shaping a metal block to provide opposite outwardly concave faces converging to a common edge, forming a passageway through the block opening out through said edge and opening out on opposite sides adjacent to said edge through the opposite converging faces of the block, positioning an open-ended tube within said passageway with the end of the tube terminating substantially flush with said edge and with the opposite sides of the tube projecting outwardly beyond the opposite faces of the block through the openings in the faces formed by said passageway, shaping said opposite projecting sides of the tube to bring them substantially flush with the opposite concave faces of the block and to form a narrow slot-like opening in the end of the tube extending in line with the edge of the block.

4. The method of making a feeder head which comprises providing a feeder head having opposite outer faces converging to a common edge and having a tube receiving passageway through the head opening out through said edge and through said converging faces adjacent to said edge, positioning an open tube within said passageway with the opposite sides of the tube at the end projecting through the openings in the faces formed by said passageway adjacent to said edge transversely thereof beyond the converging faces of the head, flattening said projecting sides of the tube within the openings through said converging faces of the head to a plane flush with said converging faces and reducing the opening through the end of the tube to a narrow slot of substantially less width than the diameter of the tube and extending in alignment with the edge of the head.

ROBERT P. SCHERER.